Figure 1:
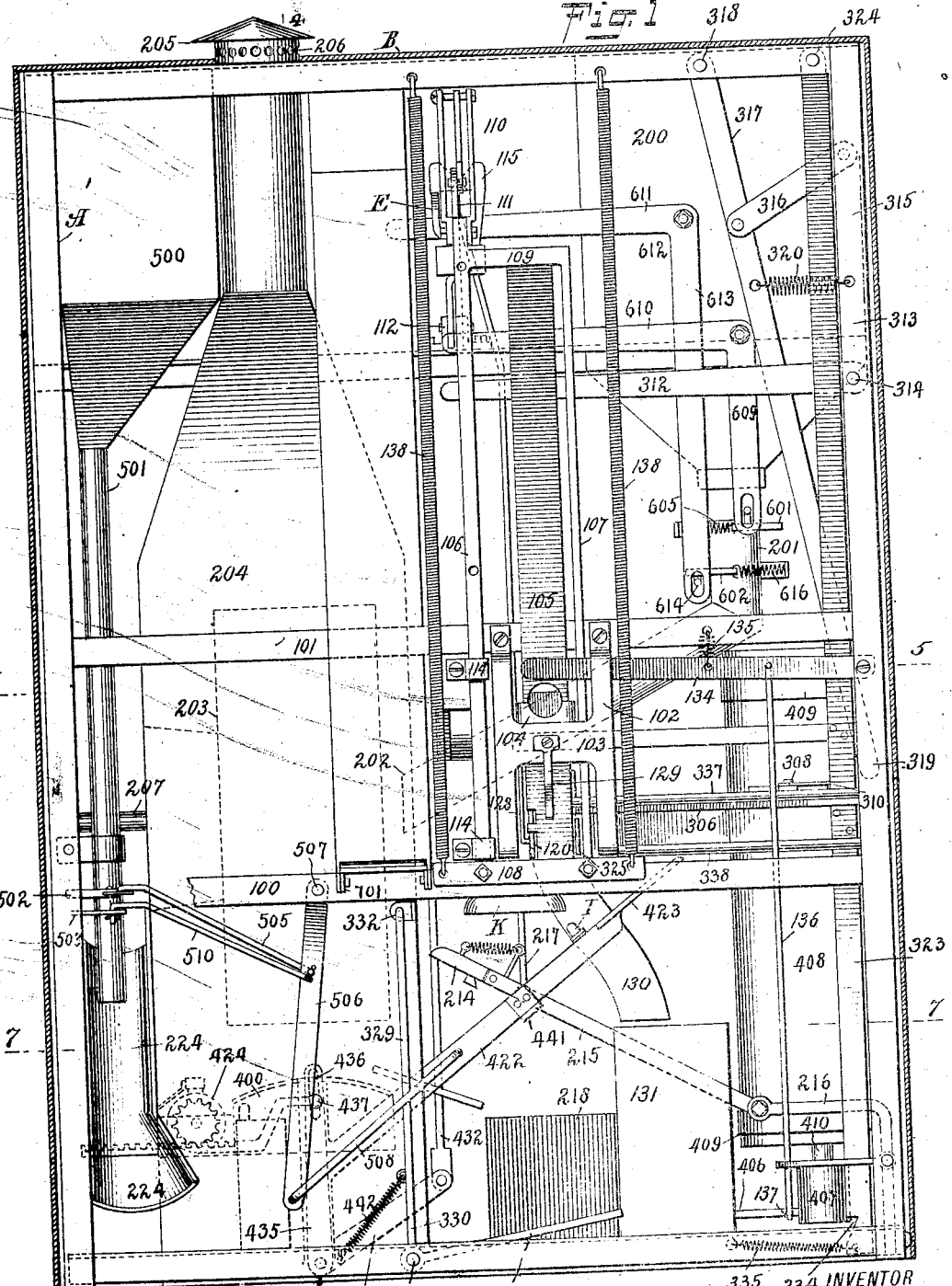

G. A. LIGHTNER.
POPCORN VENDING MACHINE.
APPLICATION FILED JUNE 27, 1912.

1,090,729.

Patented Mar. 17, 1914.
10 SHEETS—SHEET 3.

WITNESSES

INVENTOR
Guss A. Lightner
BY Munn & Co
ATTORNEYS

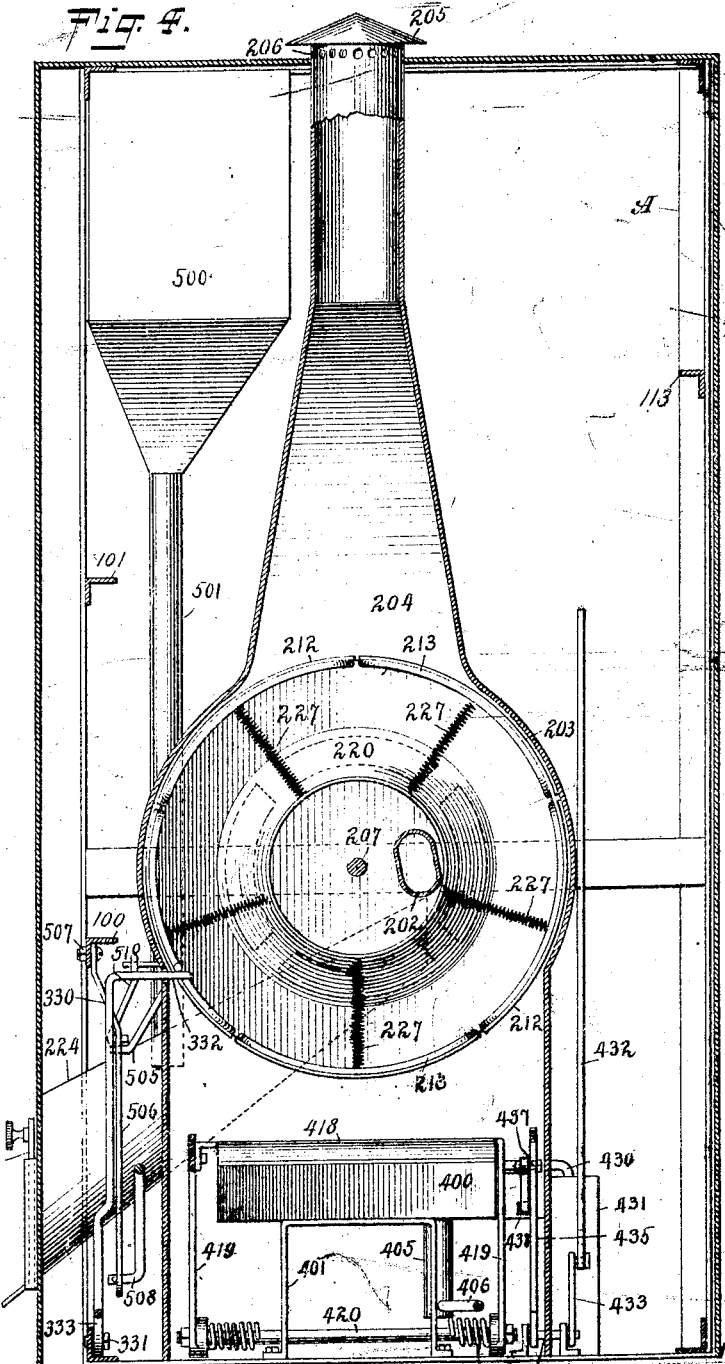

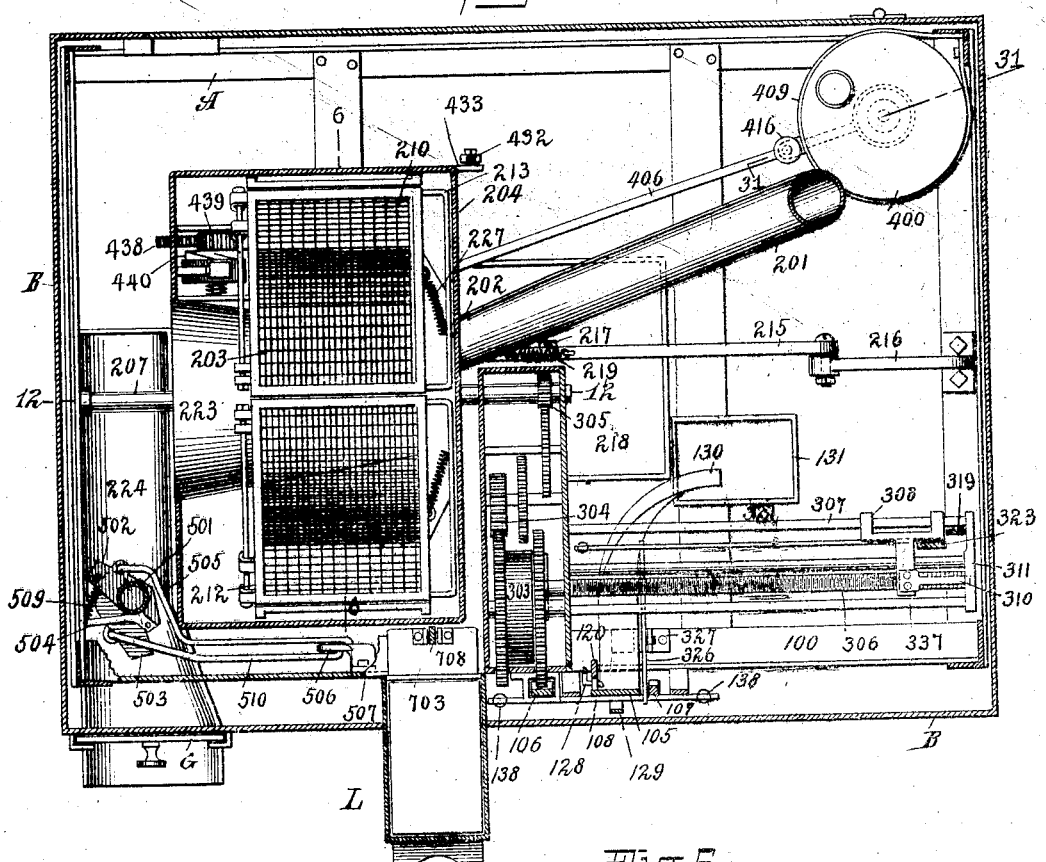
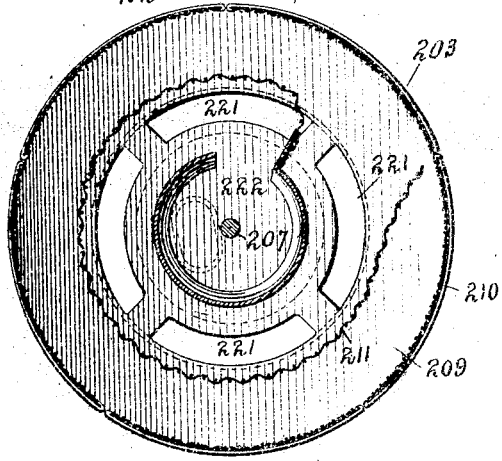

G. A. LIGHTNER.
POPCORN VENDING MACHINE.
APPLICATION FILED JUNE 27, 1912.
1,090,729.
Patented Mar. 17, 1914.
10 SHEETS—SHEET 6.
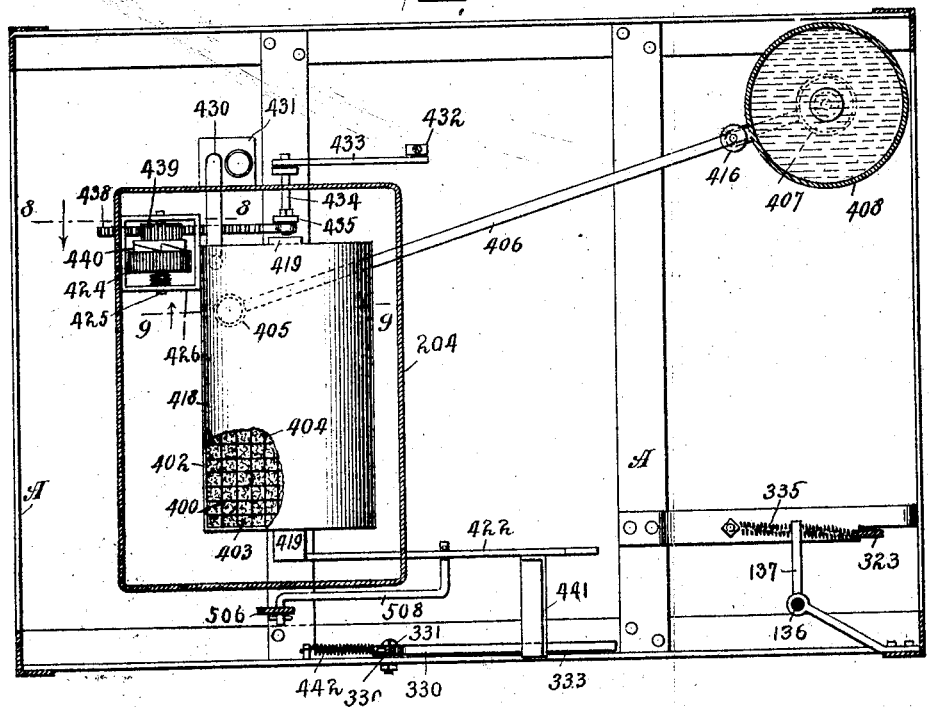
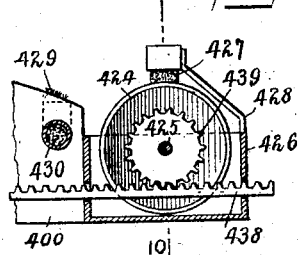
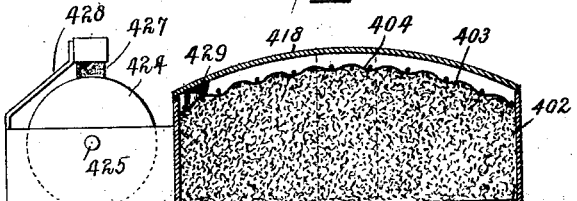
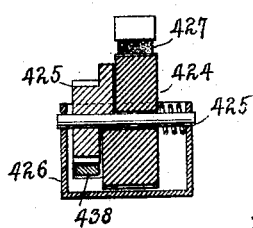
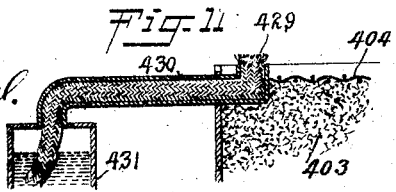
WITNESSES
William P. Goebel.
H. S. Orton
INVENTOR
Guss A. Lightner
BY
ATTORNEYS

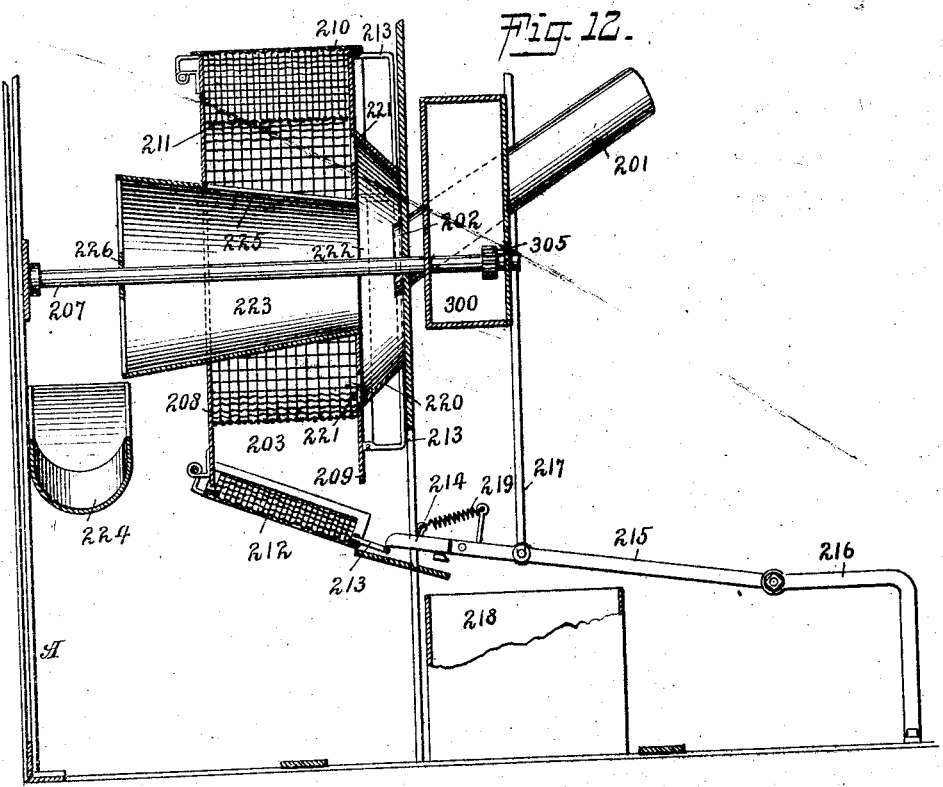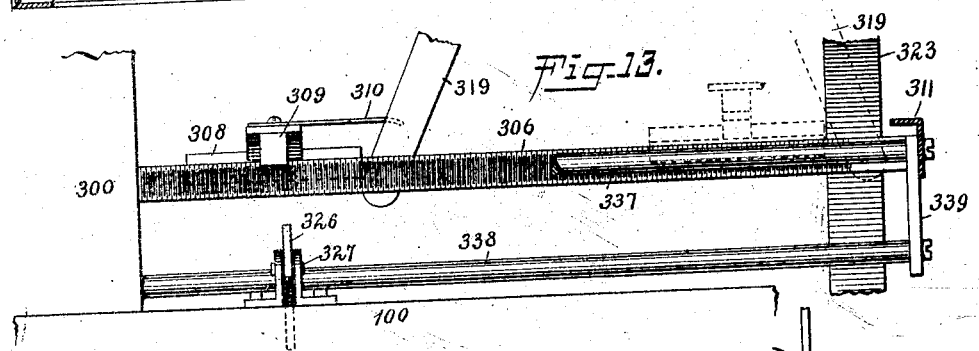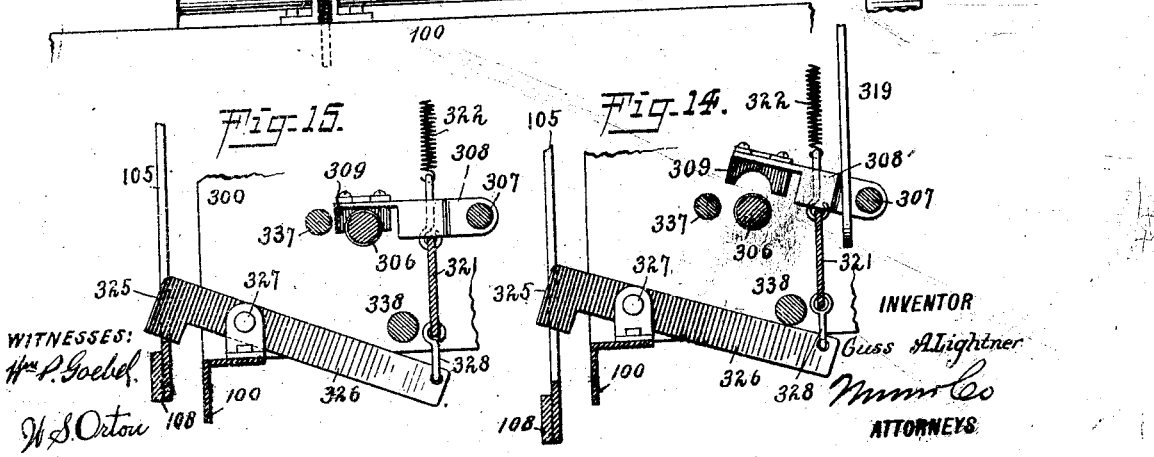

G. A. LIGHTNER.
POPCORN VENDING MACHINE.
APPLICATION FILED JUNE 27, 1912.
1,090,729.
Patented Mar. 17, 1914.
10 SHEETS—SHEET 8.
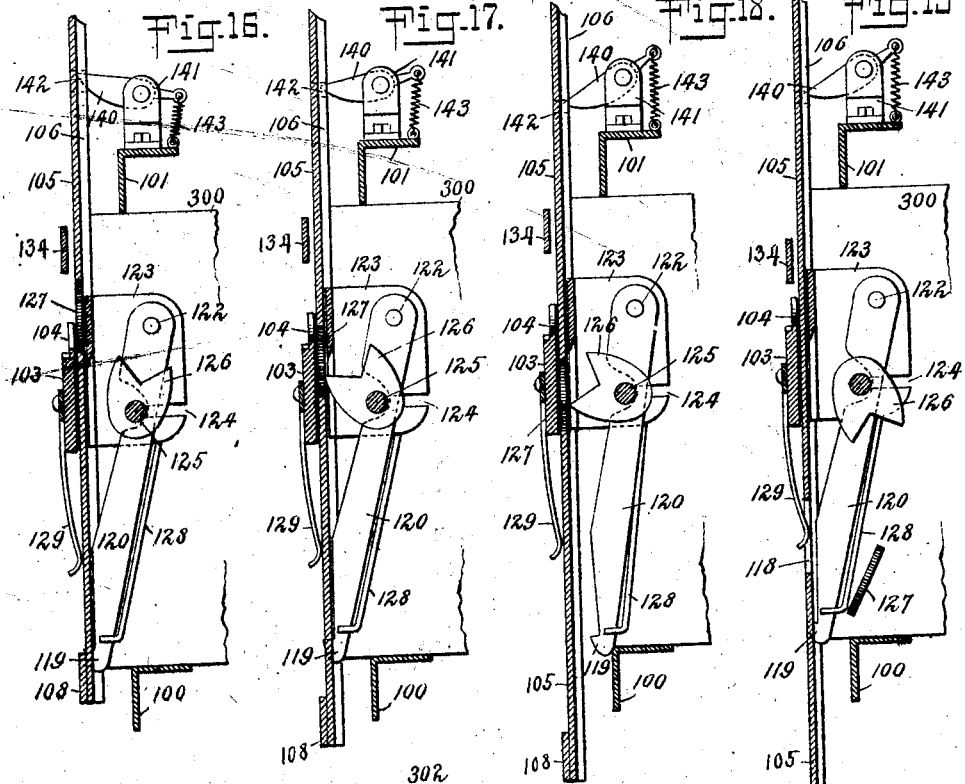
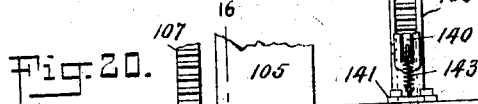
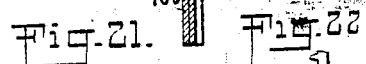
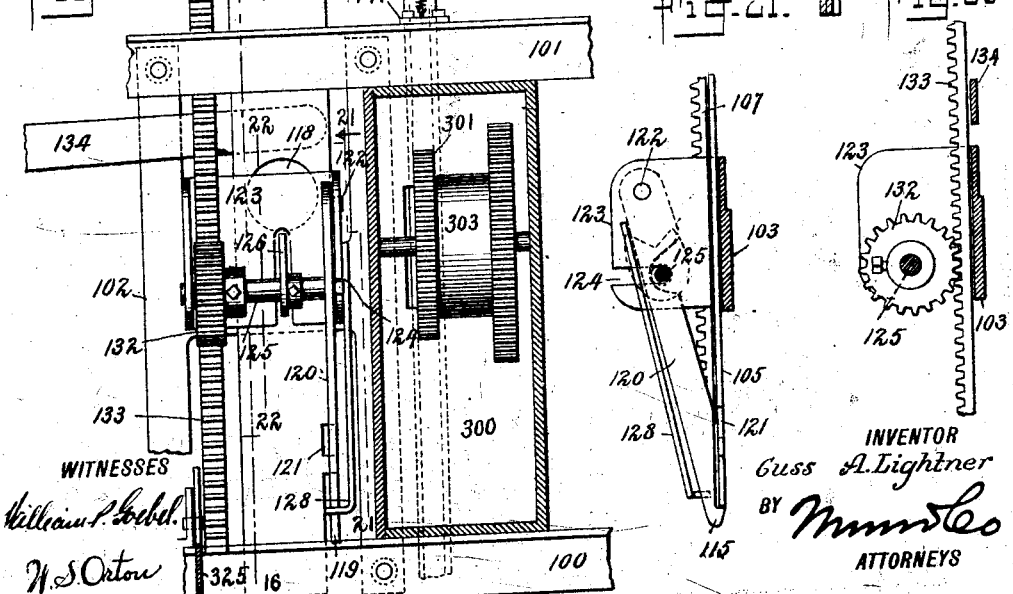
WITNESSES
William P. Goebel
H. S. Orton
INVENTOR
Guss A. Lightner
BY Munn & Co
ATTORNEYS G. A. LIGHTNER.
POPCORN VENDING MACHINE.
APPLICATION FILED JUNE 27, 1912.
1,090,729.
Patented Mar. 17, 1914.
10 SHEETS—SHEET 9.
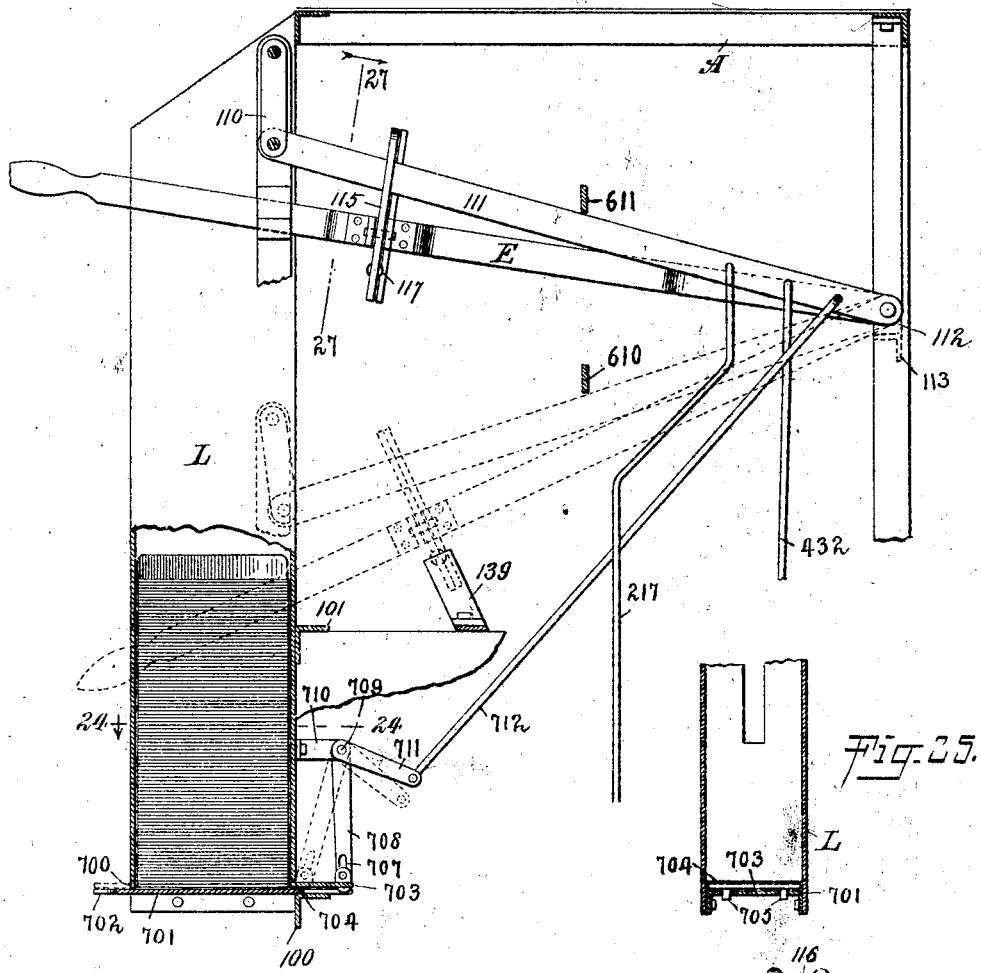
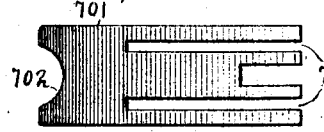
WITNESSES
INVENTOR
Guss A. Lightner
BY
ATTORNEYS

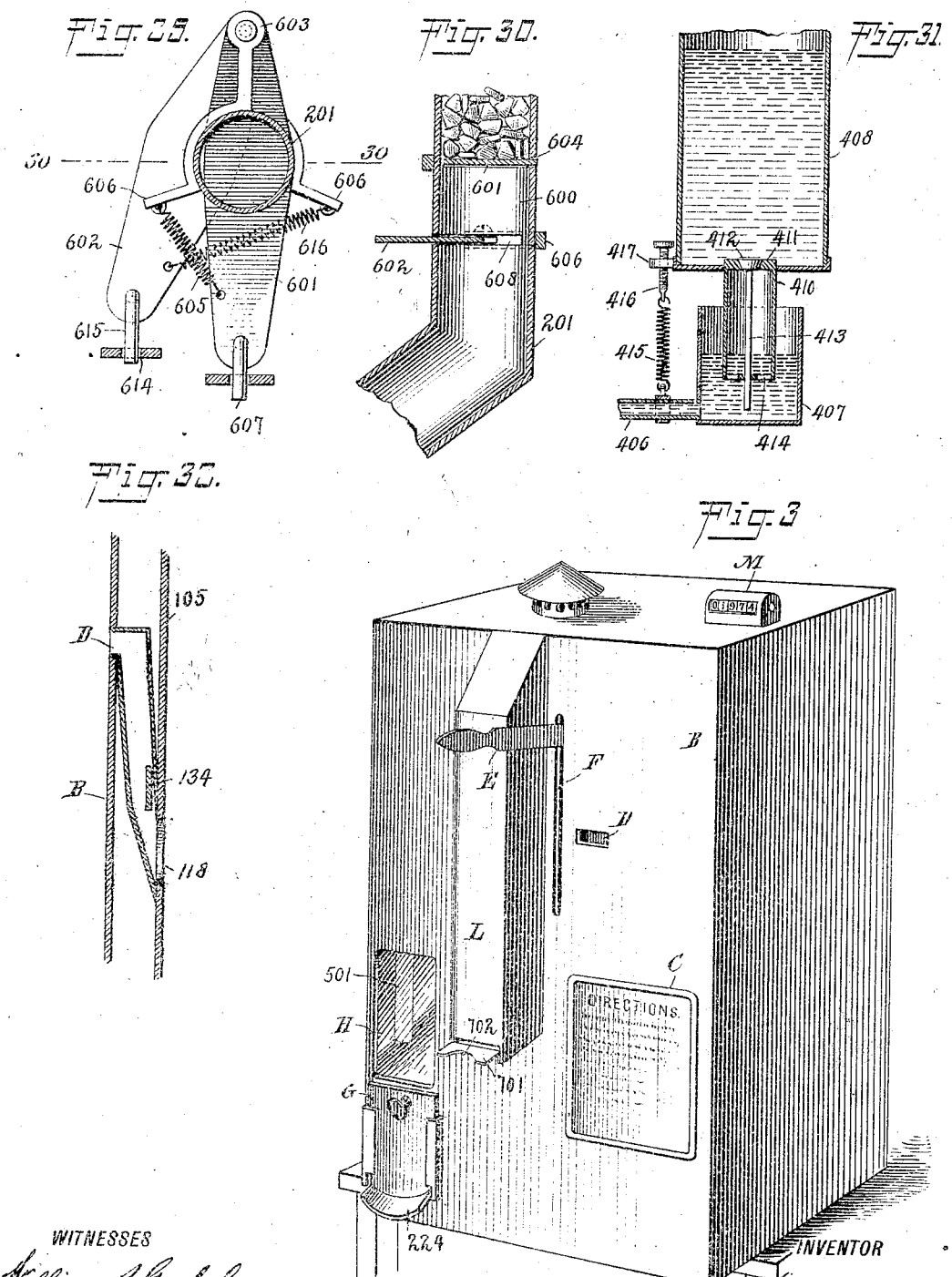

UNITED STATES PATENT OFFICE.

GUSS A. LIGHTNER, OF OLUSTEE, OKLAHOMA, ASSIGNOR OF ONE-HALF TO ROBERT B. SIFERS, OF OLUSTEE, OKLAHOMA.

POPCORN-VENDING MACHINE.

1,090,729.

Specification of Letters Patent.   Patented Mar. 17, 1914.

Application filed June 27, 1912. Serial No. 706,167.

*To all whom it may concern:*

Be it known that I, GUSS A. LIGHTNER, a citizen of the United States, and a resident of Olustee, in the county of Jackson and State of Oklahoma, have invented a new and Improved Popcorn-Vending Machine, of which the following is a full, clear, and exact description.

This invention relates in general to a vending machine of the coin-controlled class where the articles or merchandise are automatically measured, treated and delivered to the purchaser in bags furnished by the device, and the invention relates more particularly to a vending machine of the above-outlined character in which fresh corn is fed to the heated popping drum, popped for a predetermined time, salted, and delivered to the purchaser in a definite sequence of operation, all of the mechanisms being actuated by a coin-controlled device.

The primary object of my invention is to provide a vending machine of the above-indicated character which will be positive in its action, in which the different steps succeed each other in proper sequence, and in which the actuation of the several mechanisms is removed from the control of the operator after the device is once started, thereby preventing the fraudulent manipulation of the machine or the releasing of the commodities except in the manner and amounts predetermined and controlled by the construction of the machine.

A further object of the invention is to obtain a device of the above outlined character, so constructed that a repeated or multiple vendition by the use of a single coin would be frustrated, and the machine may be left unguarded without risk of loss from nefarious practice.

The preceding statements express but a few of the more important advantages of the invention, and these advantages broadly contemplate many other contributory, structural conveniences which will become apparent hereinafter, and the mechanisms and means which will be presently explained are intended to be considered as including all equivalent or analogous substances, and the form and parts illustrated are solely for the purpose of demonstrating a practical embodiment of what is believed to be a simple structure for accurately disclosing the operation.

Reference is to be had to the accompanying drawings, forming a part of this specification, in which similar characters of reference indicate corresponding parts in all the figures, and in which—

Figure 2:
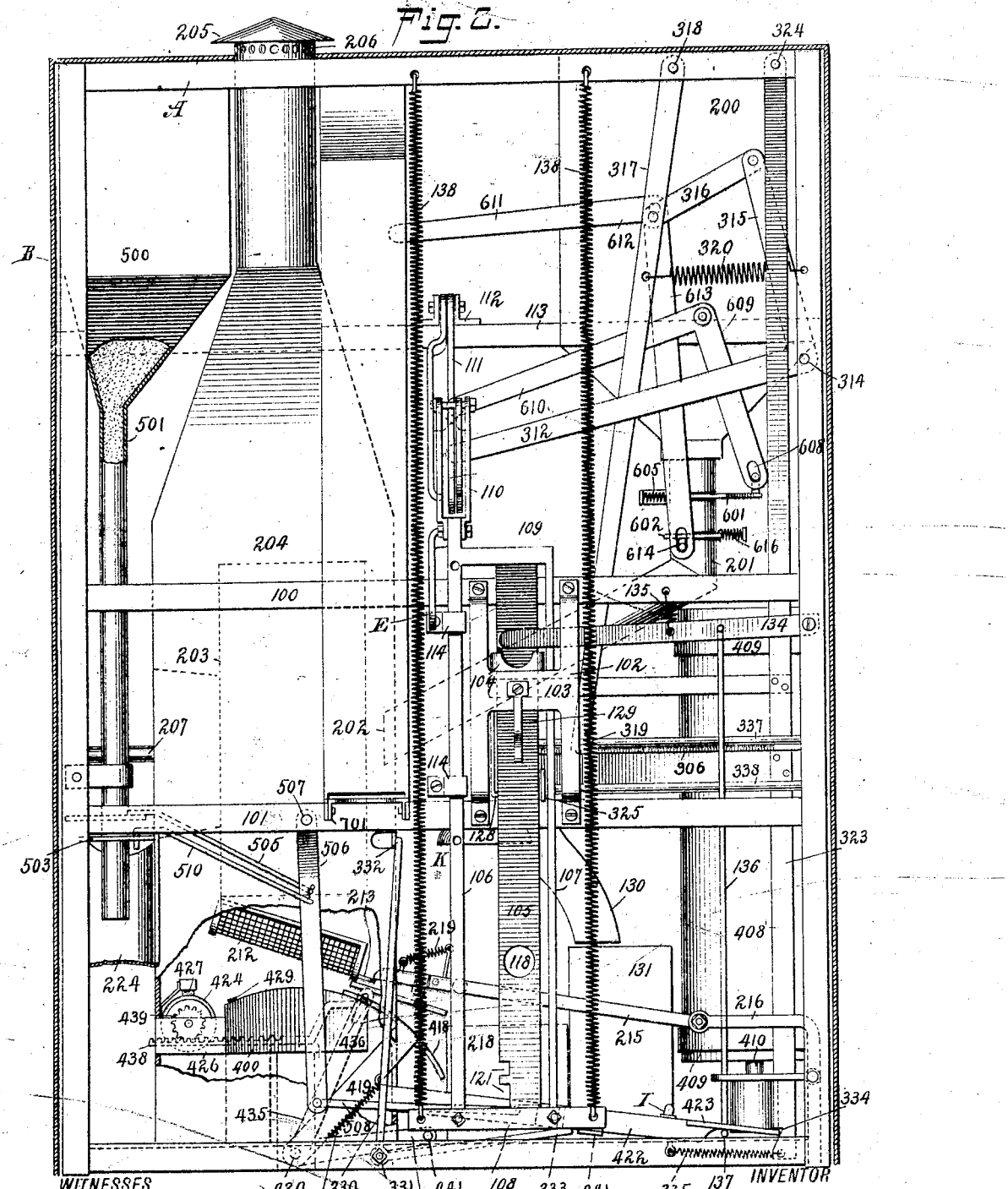
Figure 3:
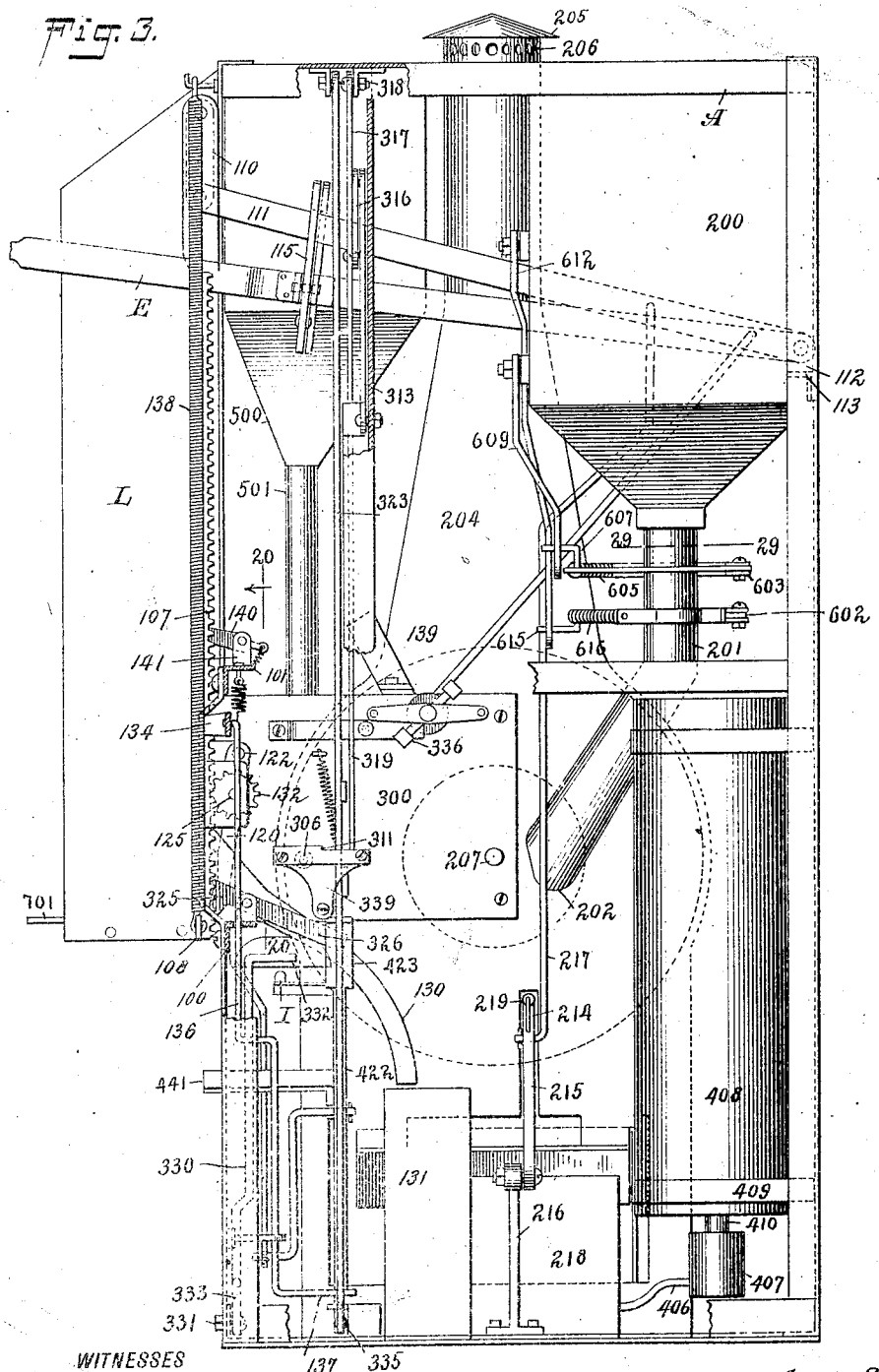

Figure 1 is a front elevation of a preferred embodiment of my invention with the covering removed and showing the internal mechanism supported from the frame. with said mechanism in its normal inoperative position; Fig. 2 is a view similar to Fig. 1, showing the main actuating frame at the limit of its down stroke and showing certain parts of the heating hood broken away to disclose the internal mechanism of part of the popping device; Fig. 3 is a side elevation of the device shown in Figs. 1 and 2, looking from the right-hand side of said Figs. 1 and 2; Fig. 4 is a vertical transverse sectional view taken on the line 4—4 of Fig. 1, looking in the direction of the arrow; Fig. 5 is a horizontal sectional view taken on the line 5—5 of Fig. 1, looking down; Fig. 6 is a transverse sectional view through the popping drum and taken on the line 6—6 of Fig. 5; Fig. 7 is a horizontal sectional view taken on the line 7—7 of Fig. 1, looking down; Fig. 8 is a transverse sectional view of the ignition mechanism; Fig. 9 is an enlarged vertical transverse sectional view taken through the heater in a plane parallel to the view of the heater shown in Fig. 2; Fig. 10 is a vertical transverse sectional view taken on the line 10—10 of Fig. 8; Fig. 11 is an enlarged sectional view showing the lighter in its position on the heater; Fig. 12 is a vertical sectional view through the popping device, and taken on the line 12—12 of Fig. 5; Fig. 13 is a vertical sectional view through the timing device controlling the motor operating the popping mechanism; Fig. 14 is a transverse sectional view of the timing device in its normal inoperative position and when the main actuating frame is on its down stroke; Fig. 15 is a view similar to Fig. 14, showing the timer in its operative position, when the main actuating frame is in its normal position; Fig. 16 is a vertical transverse sectional view through the coin plate in the front of the machine, in its normal inoperative position, and taken on the line 16—16 of Fig. 20; Figs. 17, 18 and 19 are views similar to Fig. 16, but showing the coin plate in three succeeding positions on its down stroke following the position shown in Fig. 16; Fig. 20 is a rear elevation of the main actuating frame, and taken on the line 20—20 of Fig. 3, looking in the direction of the arrow; Fig. 21 is a detailed side elevation taken on the line 21—21 of Fig. 20, looking in the direction of the arrow; Fig. 22 is a similar view taken on the line 22—22 of Fig. 20; Fig. 23 is a vertical sectional view taken centrally through the device, showing the main actuating lever and the bag-ejecting mechanism in side elevation; Fig. 24 is a horizontal sectional view through the bag reservoir and taken on the line 24—24 of Fig. 23, looking down; Fig. 25 is a fragmentary transverse sectional view of the bag reservoir and taken on the line 25—25 of Fig. 24; Fig. 26 is a plan view of the bottom plate of the bag reservoir; Fig. 27 is a detail view of a locking means for connecting the manually controlled actuating lever with the main actuating arm in the downward movement of the former, and taken on the line 27—27 of Fig. 23 looking in the direction of the arrow; Fig. 28 is a view similar to Fig. 27 but showing the device in its unlocking position, as shown in dotted lines in Fig. 23; Fig. 29 is a transverse sectional view showing the corn-measuring device and taken on the line 29—29 of Fig. 3, but this device may also be considered as the salt-measuring device, taken on the line 29—29 of Fig. 1; Fig. 30 is a vertical sectional view taken on the line 30—30 of Fig. 29; Fig. 31 is a vertical sectional view through the bottom of the fuel tank and taken on the line 31—31 of Fig. 5; Fig. 32 is a transverse sectional view through the front of the casing in line with the coin chute, and Fig. 33 is a perspective view showing the outside front of my pop-corn vending machine.

For convenience in locating and alluding to the several mechanisms, they will be described under separate heads, such as, "framework", "coin-controlled mechanism", "popping mechanism", "motor and timing mechanism", "heating and ignition mechanism", "salting device", "measuring device", and "bag-vending mechanism".

*Framework.*—Preferably the mechanism hereinafter described is mounted within a suitably braced skeleton frame A, arranged, as shown in the several figures, in the form of a parallelopiped, which frame is preferably covered with a metal or glass casing B, shown more particularly in Fig. 33. The face of the casing is provided with a frame C, which carries directions for actuating the device, and which is provided with a coin chute D. An actuating lever E projects through a vertical slot F in the face of the machine. A sliding door G is provided, which door controls the outlet of the popped corn. If desired, a glass-covered window H may be disposed above the door G, so that the purchaser may see when the corn is ready for delivery, which condition of the corn is indicated by a clapper I attached to one of the actuating mechanisms sounding a bell K at the cessation of operation of the device. Positioned in front of the face of the casing is a reservoir L, adapted to hold folded paper bags, which bags are to be used by the purchaser to carry the pop-corn delivered through the outlet. A suitable registering dial M is disposed on top of the casing and suitably attached to any of the working parts of the mechanism.

*Coin-controlled mechanism.*—Extending transversely across the face of the frame and forming a part thereof, is a pair of horizontally-disposed and vertically spaced apart ribs 100, 101. Bridging these two ribs is a vertically-extending H-shaped plate 102, projecting upwardly from the cross piece 103 of which is a yoke 104, the recessed portion being substantially semi-circular and of a size to fit dimensions of the coin intended to be used in actuating the machine. Positioned immediately in rear of this yoke 104, is a vertically-movable coin-carrying plate 105, said plate forming part of a rectangular main actuating frame, which frame also comprises two members 106, 107, disposed parallel to each other and to the plate 105. The members 106, 107 are fastened together at the bottom by a horizontally-extending plate 108, and are fastened together at the top by an integral horizontal plate 109, the plate 105 being disposed between the members 106 and 107. The member 106, hereinafter referred to as the "motor winding rack", extends above the connecting plate 109 and has its upper end pivoted by means of a bifurcated link 10, to the outer end of the main actuating arm 111, the opposite end of which arm is suitably pivoted by means of a bracket 112 to a horizontal member 113 constituting part of the framework A at the back of the device, which arm 111 is actuated by means of the main actuating lever E in a manner hereinafter described.

All of the mechanism hereinafter described might be actuated directly from the main actuating lever E, but in this case certain of the devices would be maintained in operative position, as, for instance, the heater would be maintained in open position wasting the fuel, and for that reason it is desirable that after having once started the mechanism, the future actuation of the same be removed from the control of the operator, so that the mechanism is actuated from the arm 111 and the main actuating lever E is automatically disconnected from the arm 111 when the lever E has reached the limit of its downward movement.

The coin-carrying plate 105 is maintained in position and guided in vertical movement by means of spaced-apart brackets 114, which brackets are carried by the front of the motor hereinafter described, or by any suitable portion of the frame A. In order to bring the plate 105 down from the position shown in Fig. 1 to the position shown in Fig. 2, there is positioned on the lever E, which lever has its rear end journaled in the bracket 112, a pair of clamping jaws 115, shown in detail in Figs. 27 and 28. These jaws are disposed on opposite sides of the lever E and suitably pivoted to the same, said jaws having coacting noses 116 projecting toward each other above the lever E. The noses 116 are maintained in engagement by means of an expansion spring 117, normally pressing the ends of the jaws opposite the noses away from each other. Due to the inclined top face of each of the noses 116, an upward movement of the actuating lever E will cause the jaws to straddle and engage the main actuating arm 111, thereby locking the lever E in engagement with the arm 111, so that a downward movement of the lever E will carry with it the arm 111 and the main actuating frame including the plate 105. In order to release the arm 111 from the lever E at the limit of the downward movement of the latter member, there is positioned on the motor hereinafter described, or on any other suitable part of the framework A, a V-shaped saddle 139, the crotch of which is opened upwardly and disposed in the path of and adapted to contain between the upwardly-projecting arms thereof, the lower ends of the jaws 115, causing the lower ends of the jaws to contact and permitting the release of the arm 111, so that this arm acted on through the medium of the coin-carrying frame and springs 138, is free to return to its initial position, irrespective as to whether or not the operator holds the lever E down.

The plate 105 has a coin recess 118, which recess is disposed, when the machine is in the inoperative position, in juxtaposition to the depression in the yoke 104, and the said plate is normally locked in this position by a nose 119 at the lower end of a spring-pressed lever 120, which nose engages with one of a pair of vertically spaced-apart recesses 121 on one edge of the plate 105. The lever 120 is pivoted at 122 to a bracket 123 extending from the rear of the cross-piece 103 of the H-plate 102, which bracket 123 has a rearwardly-facing horizontally-disposed slot 124 (see Figs. 16 to 19, inclusive), in which slot is slidably mounted one end of a shaft 125, the opposite end of which shaft is journaled in the oppositely-disposed portion of said bracket. The shaft 125 carries a double-pointed nose detector 126, the noses of which are adapted to rotate in the coin recess 118 when there is no coin in this recess, but should a coin 127 be in said recess, the noses of the detector contacting with the coin, will react on the shaft 125 and the lever 120 acting against the spring will disengage the nose 119 from the recess 121, thereby, as shown more particularly in Fig. 18, unlocking the plate 105, permitting it to be moved downward by the lever E acting on the arm 111. By this construction, it will be seen that a coin must be inserted in the slot before the plate 105 can be moved to actuate the several mechanisms hereinafter described.

When the plate 105 has been actuated, the coin is ejected from the recess 118 by means of a lever spring 129 projecting downwardly from the cross-piece 103, the free end of which spring 129 is curved inwardly and normally bears on the plate 105, so that as the recess 118 passes the free end of the spring 129, as shown more particularly in Fig. 19, the latter presses the coin inwardly out of the recess 118, causing said coin to fall through a channelway 130 leading to a coin receptacle 131.

The shaft 125 (see Fig. 20) has mounted upon one end a pinion 132, permanently in mesh with a rack 133 carried by the back of the member 107. By this construction, it will be seen that any actuation of the frame of which the member 106 is a part, tends to rotate the detector 126 toward the coin recess 118, and unless there is a coin in this recess to withdraw the nose 119 from the plate 105, this plate, of course, will be locked in position, but the length of the slot 121 will permit the movement of the main carrying frame and coin plate 105, to start the detector toward the coin recess 118. When the plate 105 is on its down stroke, it is desirable to close the coin slot D to prevent the insertion of a second coin until the device is in position to be again actuated, and for this purpose, a lever arm 134 is provided, having one end pivoted to the frame A and the opposite end, when in its lowered position, covering the recess 118, and is normally maintained in position uncovering the recess by means of a spring 135. Attached to the lever 134, intermediate its length, is one end of a reach rod 136, the lower end of which is turned inwardly to form a step 137 (see Fig. 3), which step is disposed below and adapted to be engaged by a finger 423, forming a part of the cover of the heater hereinafter described, so that as long as the heater and other mechanisms are in operating position treating the corn, the coin recess 118 is in closed condition, that is, the device cannot be again actuated by the insertion of a second coin until it has completed its cycle of operation. The main framework formed of the members 106, 107, 108 and 109, is maintained in the raised position shown in Fig. 1, by a pair of transversely-disposed coil springs 138, which springs have their upper ends suitably fastened to the top of the frame A, and their lower ends suitably fastened to opposite sides of the plate 108.

It is necessary to the operation of the several mechanisms hereinafter described, that the framework including the coin-carrying plate be actuated in one direction for the entire length of its stroke before it is permitted to return, this being necessary for the proper succession of events taking place. This complete movement in both directions is controlled by a pawl 140 (see Figs. 16 to 18), in the form of a lever pivoted to a bracket 141 mounted on the rib 101, which pawl 140 has a nose 142 in engagement with the teeth 302 forming a rack on the back of the member 106. The end of the pawl 140 opposite the nose 102, is connected under tension to the rib 101 by means of a spring 143. A downward movement of the motor-winding rack 106 is permitted, the teeth 302 sliding by the nose 142 as the nose is depressed against the action of the spring 143, in this case the pawl 140 being inclined against the action of the spring 143, as shown more particularly in Fig. 18. Interruption of the teeth occurs at the point where the member 106 has reached the limit of its movement in either direction, permitting the pawl to be acted upon by the spring 143 and to assume the upwardly-inclined position shown more particularly in Fig. 16, thereby permitting the retreat of the coin-carrying framework to its initial position. The main actuating frame in its downward movement actuates the several mechanisms hereinafter described.

*Popping mechanism.*—A reservoir 200 adapted to contain fresh unpopped corn, is disposed at the upper right-hand corner of the frame A, as shown more particularly in Figs. 1, 2 and 3, from the bottom of which reservoir extends a corn chute 201, the passage of corn therethrough being controlled and the corn measured, by a measuring device hereinafter described. The chute terminates in the opening 202 of a revoluble popping drum 203, which drum is inclosed in a vertically-extending hood 204, the upper end of which hood is contracted and projects through the top of the casing B and is capped by means of a cowl 205. The hood has a series of openings 206 disposed about the same above the top of the device, so as to permit of the escape of the products of combustion generated by the burner hereinafter described. The corn-popping drum 203 is suitably mounted upon a shaft 207, one end of which is suitably journaled in the side of the frame A and the other end in the motor hereinafter described. The drum 203 comprises two spaced-apart side plates 208, 209, (see Fig. 12), which plates are connected by means of a pair of concentrically-disposed perforated bands 210, 211, the outer band 210 being formed of a plurality of arch-shaped perforated frames 212 suitably pivoted to the outside of the plate 208 and normally maintained in closed position by means of the springs 227, which springs tend to maintain the frames in position to form the outer perforated cylindrical band 210. The perforated frames 212 each have a wire track 213 extending inwardly beyond the plane of the plate 209; the lower of which tracks 213 is adapted to be engaged by a tripper 214, which tripper forms one end of a lever 215, the opposite end of which is suitably pivoted to a bracket 216 extending upwardly from the bottom of the machine. Intermediate the length of the lever 215, is pivoted the lower end of a reach rod 217, the upper end of which rod is pivotally connected to the arm 111, so that when said arm is moved down, the tripper 214 will engage the track 213 of the lower frame 212, depressing the latter to open the lower section of the outer band 210, in order to dump therefrom all refuse and small particles which sifted through the inner band 211 in the preceding actuation of the device, into a refuse tank 218 (see Fig. 12). The tripper 214 is maintained in alinement with the lever 215 by means of a spring 219, said tripper being hinged to escape from the wire track or stop 213 when the tripper returns to its upper position, the frame 212 escaping from the tripper just before the latter reaches the limit of its downward movement, as shown in Fig. 2.

Extending from and integral with the outside of the plate 209, is the larger base of an open-ended frusto-conical member 220 (see Fig. 12), within the smaller end of which projects the lower open end 202 of the chute 201. The plate 209 has a series of apertures 221 concentrically disposed relative to the shaft 207 within and in juxtaposition to the connection of the member 220 with the plate 209, so that the corn will pass through said apertures into the inner band or drum 211. The plate 209 has a concentrically-disposed opening 222 outlined by the smaller end of the funnel-shaped member 223, arranged in the form of the frustum of a cone, the larger end of which member extends some material distance beyond the plate 208 and terminates just above a downwardly- and forwardly-inclined delivery chute 224. The funnel member 223 has an opening 225 disposed between the plates 208 and 209, said funnel member 223 being journaled by means of a spider 226 (see Fig. 12) on the shaft 207. A chute 224 terminates in the lower left front side of the face of the casing and is closed by the sliding door G.

It will be understood that the corn released from its reservoir passes through the chute 201 into the frusto-conical member 220 and is fed into the inner band 211 through the apertures 221. Through a mechanism hereinafter described, the drum is rotated on its shaft 207 for a number of revolutions depending upon a timing mechanism also hereinafter described. The centrifugal force of the rotating drum will maintain the corn against the inner band 211, the small particles, chaff, &c., passing through the fabric forming this drum and falling into the compartment formed between the bands or drums 210 and 211. As the rotating drum loses its momentum, the corn which has been popped by the action of the heat generated by the burner disposed beneath the rotating drum, will fall through the opening 225 into the funnel member 223, and due to the inclined bottom of this member, the corn will slide into the chute 224, from which it may be withdrawn, after it is salted by mechanism hereinafter described, by raising the sliding door G. The small particles, chaff, &c., which have fallen on to the lower perforated frame 212, will be dumped into the receptacle 218 when the device is again actuated.

*Motor and timing mechanism.*—In order to rotate the popping device, a spring-actuated motor 300 is mounted on the ribs 100 and 101, in rear of the motor-winding rack 106, said motor being of any suitable construction, and, as shown, has a winding gear 301 in mesh with the teeth 302 on the rear of said motor-winding rack. By suitable connection, the downward movement of the rack 106 will wind a spring 303, from which motion is conveyed through a suitable train of gears 304 to a pinion 305 mounted on the shaft 207. The rotation of the train of gears and drum is controlled by a timing mechanism, which timing mechanism comprises a threaded screw 306 forming part of the train of gears. Disposed in rear of the screw and parallelly disposed relative thereto, is a track 307, slidably mounted upon which track is a carriage 308, carrying a locking-nut 309, adapted to fall into contact with the screw 306. In its normal initial and locking position, this nut is in position on the portion of the threaded screw farthest removed from the motor 300, and is held in this position, as shown in dotted lines in Fig. 13, by the engagement of a finger 310 projecting forwardly from the carriage 308, said finger 310 engaging beneath a shoulder 311, forming one end of a triangle-shaped frame 339 comprising the screw 306, the track 307, and bracing rods 337, 338, which rods extend parallel to the screw and track, the rod 338 further serving as a stop for the upward movement of the lever 326 hereinafter described, and shown more particularly in Fig. 14.

The actuating lever E in its initial movement on its down stroke, contacts with the arm 312 of a bell crank lever 313 pivoted to the frame A at 314. The end of the upwardly-extending arm 315 of the bell crank lever 313 is pivoted to the end of a link 316, the opposite end of which is pivoted to an actuating lever 317, the upper end of which lever is pivoted to the frame A at 318 and the lower end of which lever is free to act on the carriage 308, to move the same to the left, as shown in full lines in Fig. 13. On the return of the actuating lever E to its normal position shown in Fig. 1, the system of levers 313 and 317 is returned to its original position by means of the tension spring 320 attached to the frame A and to the lever 317.

The locking nut 309 is normally maintained out of engagement with the screw 306 by a plate 321, which plate extends parallel to the screw 306 and is so disposed that the carriage 308 will ride thereon, the plate being resiliently maintained in raised position by a tension spring 322 attached to one end of said plate, the opposite end of which plate is suitably pivoted to the locking arm 323, which locking arm has its upper end pivoted at 324 to the top portion of the frame A. The continued downward movement of the arm 312 acted on by the main lever E, will move the carriage 308 to the left, as shown in full lines in Fig. 13, but out of engagement with the screw, as shown in Fig. 14. The upward movement of the horizontal plate 108 will bring the same in contact with the outer end 325 of a lever 326, which lever is fulcrumed, intermediate its length, on a bracket 327 carried on top of the rib 100, the opposite inner end of which lever is connected by means of a link 328 to the lower edge of the plate 321, so that the upward movement of the actuating lever E carrying with it the main actuating frame hereinafter described, will lower the plate 321 acting against the tension of the spring 322, permitting the locking nut 309 to fall into engagement with the screw 306.

The drum and its actuating parts are normally locked in inoperative position by means of a vertically-disposed arm 329 of a bell crank lever 330, which bell crank lever is pivoted at 331 to the lower portion of the frame A, said arm 329 having a bent portion 332 holding the drum from rotation by engaging between the wires forming the tracks 213 of each of the frames 212. The horizontally-disposed arm of the bell crank lever 330 is disposed below and in the path of the L-shaped plate 441, forming part of the burner-covering mechanism hereinafter described, so that this plate when depressed by the plate 108, which in turn is actuated by the main lever E, reaches the limit of its downward movement, it disengages the locking bell crank lever 330 from its engagement with the popping drum, as shown in Fig. 2, the bell crank lever being returned to its locking position by means of a spring 442 (see Fig. 1). The drum and gear train are free to rotate under the action of the spring 303, and the plate 321 is held downward by the engagement of an arm on the burner hereinafter described with a notch 334. The carriage 308 travels on the screw 306 to the right to the position shown in dotted lines in Fig. 13, until it is engaged under and is stopped by the shoulder 311 hereinafter described. As it approaches this limiting position, it moves the locking arm 323 to the right, disengaging the lever 323 from its connection with the cover of the burner, at 334, acting against the tension of the spring 335, the bell crank lever 330 being released to lock the drum from rotation by means hereinafter described. By this construction, it will be seen that the popping drum is given a number of rotations depending upon the threads on the screw 306. A suitable governor 336 is connected with the gear train 304 to regulate the speed of rotation of the drum. On the next actuation of the main actuating plate, the lever 326 will be deprived of its supporting plate 108, permitting the plate 321 to be raised out of engagement by the spring 322, and the end 319 of the lever 318 will, at the same time, act on the carriage 308 to move the same to the left of the screw 306, as shown in Figs. 13 and 14.

*Heating and ignition mechanism.*—During the rotation of the drum containing the corn, the same is subjected to heat generated by a burner 400 disposed beneath the drum and at the bottom of the hood 204. This burner is suitably positioned on a bracket 401, which in turn is supported by the bottom portion of the frame A. As shown more particularly in Fig. 9, the burner comprises a trough 402, containing asbestos or other suitable packing 403 covered by a screen 404. In fluid connection with the trough 203 and depending therewith, is a tube 405 also containing asbestos, and leading to the bottom of this tube is a relatively long, flexible, metallic pipe 406, the opposite end of which is in fluid connection with a trap 407 disposed beneath a fuel tank 408, as shown more particularly in Fig. 31, which tank, in this instance, is suitably positioned below the corn reservoir 200, as shown in Fig. 3, and attached to the frame A by means of straps 409. The tube 405, pipe 406 and trap 407, form, in effect, a broad U siphon. The trap 407 has an open top and telescopes a tube 410 depending from the tank 408 and preferably forming an integral part thereof. The tube 410 has a valve seat 411, permitting the fuel from the tank 408 to pass through the tube 410 into the trap 407. The valve opening 411 is controlled by a valve 412, the valve stem 413 of which extends into the trap 407, terminates a short distance above the bottom of said trap, and is guided in its movement by means of a spider 414 outlining the lower end of the tube 410. The trap 407 is maintained in position relative to the tank 408 by means of a tension spring 415, which tension spring suitably engages the pipe 406 adjacent the trap 407 and has its opposite end connected to a tension-regulating screw 416 in threaded engagement with a bracket 417 projecting from a tank 408.

By the above outlined construction, it will be seen that the weight of the fuel in the trap 407 acts against the tension of the spring 415, to maintain the bottom of the trap out of engagement with the stem 413, permitting the valve 412 to rest on its seat 411, and in this way the fuel is siphoned from the trap 407 through the pipe 406, tube 405, to the asbestos 403 in the trough 402. The consumption of the fuel gradually lessens the tension on the spring 415, permitting the trap 407 to raise, which movement permits the bottom of the trap to act on the stem 413, opening the valve 412, permitting the introduction of fresh fuel into the trap 407. The weight of the added fuel forces the trap away from the stem 413, and in that way the liquid fuel is automatically fed to the burner as needed. The burner is normally covered by means of a curved plate 418, said plate being supported on opposite sides of the burner by means of vertically-extending arms 419, each of which arms is loosely mounted upon a shaft 420, encircling which shaft and having one end of each attached thereto, is a pair of springs 421 (see Fig. 4), the opposite end of each of which springs engages the arms 419 under tension, so as to normally maintain the cover in position closing the heater 400. The outermost arm 419 has extending therefrom at an acute angle, a relatively long arm 422 terminating in a finger 423, which finger engages the notch 334 on the locking arm 323, hereinbefore described. This engagement maintains the cover in open position until it is released by the carriage 308 contacting with said arm 323, as hereinbefore described. Projecting at right angles from the long arm 422, is a contacting L-shaped angle plate 441 disposed beneath and in the path of the downwardly-movable main actuating frame, so that said frame contacts with the plate 441 (see Fig. 7) lowering the arm 422 into the position shown in Fig. 2.

By the above outlined construction, it will be seen that the burner is in open position during the passage of the locking nut along the screw 306 and is closed when this nut reaches the limit of its movement. In other words, the burner is brought into open position at the end of the down stroke of the actuating lever E and is maintained in that position for the predetermined length of time it has taken the locking nut 309 to travel along the screw 306. When the finger 423 is disengaged from the notch 324, the arm 422 acting under tension of the springs 426, returns the lever and its attached cover 418 to its initial position, closing the burner 400 and extinguishing the flame.

I have provided an automatic ignition system, which comprises a sparking device consisting of a roughened peripheral wheel 424 (see Figs. 8, 9 and 10), loosely mounted on a shaft 425 in a box 426 disposed adjacent the burner 400, which box supports a carborundum stone 427, in frictional contact with the periphery of the wheel 424, by means of a suitable bracket 428. Sparks from the carborundum stone light on the wick 429, the free end of which is positioned within the burner 400 and leads by means of a wick tube 430 to a reservoir 431 of combustible fluid.

In order to rotate the wheel 424, there is attached to the arm 111 one end of a reach rod 432, the other or lower end of which is attached to an arm 433 exterior of the hood 204, which arm is rigidly mounted upon a shaft 434 (see Figs. 4 and 7), which shaft also carries a second arm 435 within the hood 204. The arms 433 and 435 and shaft 434 form, in effect, a bell crank lever. The arm 435 has a slot 436 therein adjacent the free end, said slot having a pin 437 forming a pin-and-slot connection with a rack 438, which rack meshes with a pinion 439 loosely mounted upon the shaft 425 carrying the wheel 424. A one-way clutch 440 connects the pinion 439 with the wheel 424. The teeth of the clutch 440 are so arranged that the downward movement of the rod 432 causes the pinion 439 to run idle on the shaft 425, but the upward movement of the arm 111 after it has been released from its connection with the lever E, rotates the rack 438 in a direction to drive the wheel 424 on the carborundum stone, causing this stone to spark and ignite the wick, the flame of which wick in turn fires the burner 400. By this construction, it will be seen that the burner is not ignited until the arm 111 is on its return movement after having completed its down stroke and not until the drum has started to rotate under the control of the timing mechanism hereinbefore described, and only when the arm 111 is disengaged from the lever E, and therefore is beyond the control of the operator.

It will be seen from the above, that the burner is not lighted until after the corn is in the popper and the drum about to start on its cycle of rotation. Of course, the closing of the burner at the end of the cycle of rotation of the popping drum, will extinguish the flame in the burner.

*Salting device.*—It is desirable that after the corn has been popped and is ready to be delivered to the purchaser, the same be automatically salted, and with that object in view, there is provided a salt reservoir 500, having depending therefrom a salt conduit 501, the lower end of which terminates within the delivery chute 224, which chute 501 has a measuring and delivering mechanism hereinafter described, positioned intermediate its length, so that a final movement in the cycle of operations described, with reference to this device, would be to automatically deliver a measured quantity of salt on to the popped corn within the chute 224. The salt is measured and its passage through the salt conduit 501 is controlled by means of a pair of spaced-apart leaf valves 502 and 503, each valve extending through a slot in opposite sides of the conduit 501. The upper valve 502 has one end pivoted to a bracket 504 (see Fig. 5) suitably supported by the frame A, and a link 505 is attached to the valve 502 on the side opposite its attachment to the bracket 504, which link 505 is pivoted to a lever arm 506, the upper end of which is pivoted at 507 to the rib 100 and the lower end of which arm is connected by means of a link 508 to the drum 422, intermediate its length.

The valve 502 is normally maintained in its position closing the conduit 501, by means of a spring 509 (see Fig. 5) having one end attached to the valve 502 on the side carrying the connection of the same with the rod 505, said spring having its opposite end suitably attached to the bracket 504. The lower valve 503 has one end suitably pivoted to the conduit 501 and has its opposite end pivoted to a rod 510, which rod is also pivoted to the lever arm 506. By this construction, it will be seen that an amount of salt depending upon the distance between the valves 502 and 503, is carried in the space between these valves, and in the normal position of the valves, the upper valve 502 is open and the lower valve 503 is closed, permitting the salt to flow from the reservoir 500 into the compartment formed between these two valves. The final movement of closing the burner actuates the valves, closing the upper one and opening the lower one, thereby permitting the escape of the salt contained between the two valves into the chute 224.

*Measuring device.*—A limited quantity of unpopped corn is fed from the hopper 200 at each actuation of the machine. The passage of the corn through the chute 201 is controlled and the corn measured by a measuring device 600 (see Figs. 29 and 30), which measuring device comprises two spaced-apart leaf valves 601 and 602, the upper valve 601 being pivoted to a bracket 603 carried by the chute 201 and moving into said chute 201 through a slot 604 in one side thereof. The valve 601 is normally held closed by a spring 605, one end of which is attached to the valve on the side of the chute opposite the pivotal connection with the bracket 603, the other end of said spring being attached to an extension 606 forming part of the bracket 603. The end of the valve 601 having the spring attached thereto, has projecting therefrom an angle pin 607 movable in a slot 608 in one arm of a bell crank lever 609, the opposite arm 610 of which bell crank lever is disposed in the path of and below the arm 111, so that when this arm 111 is in its normally raised position shown in Fig. 23, it will permit the spring 605 to act, normally closing the valve 601. The downward action of the arm 111 will act against the tension of the spring 605 to open the valve 601, permitting corn to drop from the reservoir 200 on to the valve 602. The return of the arm 111 will, of course, permit the valve 601 to close, thereby shutting off the supply of corn from the reservoir 200.

In the upward movement of the arm 111 after it has been released from the actuating lever E, said arm 111 will bear on the arm 611 of a bell crank lever 612, the other arm 613 of which bell crank lever is connected by means of a pin-and-slot connection 614, the pin 615 of which extends from the free end of the lower valve 602, the opposite end of which valve is suitably pivoted to the bracket 603 and enters the chute 201 in the side opposite to that in which the valve 601 enters. It will be seen that the upward movement of the arm 111 first permits the upper valve to close, and as the arms 610 and 611 are some material distance apart, as shown in Figs. 2 and 23, said arm 111 will, after a unit of time, act upon the upper arm 611 to open the lower valve and to hold the same in open position against the action of the spring 616.

The device herein described for measuring the corn may be substituted for the device hereinbefore described for measuring the salt.

*Bag-vending mechanism.*—It is desirable in a machine of this character, to supply folded paper bags in which to carry the popped corn. The bag reservoir or container L is disposed in front of the machine, which reservoir has a slot 700 in the bottom of the front face thereof, the bottom of which reservoir is defined by a plate 701 projecting in front of the reservoir, the front edge of which plate is recessed, as shown at 702, in order to facilitate the grasping of the front portion of a projecting bag. The lowest bag of the stack of folded bags in the container L, is projected through the slot 700 by means of an ejector plate 703 (see Fig. 23), which plate is positioned in the slot 704 in the rear of the reservoir and has a pair of transversely spaced-apart depending lugs 705 movable in a pair of transversely-disposed slots 706 in the bottom plate 701. The plate 703 is pivoted by means of a pin-and-slot connection 707 to an arm 708 carried by a shaft 709, which shaft is supported by a bracket 710. Also rigidly mounted upon the shaft 709 is an arm 711, forming with the arm 708, a bell crank lever. The end of the arm 711 is connected by means of a reach rod 712 to the arm 111 adjacent its pivotal connection. The bag is withdrawn from the plate 701 in folded condition, is then opened and disposed over the lower end of the chute 224 to receive the popped and salted corn when the door G is raised.

*Operation.*—Assuming all of the parts to be in the position indicated in Fig. 1 and the requisite coin inserted in the slot D, the operator will bring the lever E from the position shown in full lines in Fig. 23 to the position shown in dotted lines in said figure. The lever in its downward movement carries with it the arm 111, which arm acting through the reach rod 712 (see Fig. 23), will also act on the plate 703 to partly eject a paper bag through the slot 700, and, at the same time, acts on the rod 432 to move the rack 438 of the igniter into position to actuate the sparking device on the return movement of this rod. At the same time, the arm 611 of the bell crank lever 612 being deprived of the support afforded by the arm 111, permits the spring 616 to open the valve 602, so that the corn will fall by gravity through the chute 201 into the inner compartment of the corn-popping drum within the band 211. This same movement of the arm 111 acts on the rod 217 and lever 215, to open the lower frame 212 and to dump from the outer drum 210, all refuse remaining from a previous operation of the machine. A further movement of the actuating lever E in its downward movement, causes it to contact with the arm 312, and acting through the system of levers 315, 316 and 317, moves the carriage 308 into its starting position shown in full lines in Figs. 13 and 14. The continuation of the movement of the arm 215 causes the tripper 214 to escape from its engagement with the track 213, permitting the lower of the frames 212 to be acted upon by the spring 227, to return the frame 212 to its normal closing position. As the plate 108 of the coin-carrying frame approaches the limit of its downward movement, it engages the L-shaped plate carried by the arm 422 attached to the cover of the burner and lowers this arm until the finger 423 engages the notch 334, which holds the cover of the burner in open position. At the same time, the arm 422 acts on the bell crank lever 330 to unlock the corn-popping drum, placing the latter in position to be rotated by the motor. This same downward movement of the arm 422 acts through the arms 508 and 506 to open the upper valve 502 in the salt chute, and closes the lower valve 503, thus permitting the salt to fall between the two valves 502 and 503. In this locked position of the arm 422, the finger 423 bears on the reach rod 136, and acting against the tension of the spring 135, maintains the free end of the lever 134 in position closing the coin chute. At the same time that the coin-carrying frame reaches the limit of its downward movement, the lower ends of the jaws 115 engage the saddle 139, thus disengaging the main actuating lever E from any further control of the several mechanisms. The coin-carrying frame having reached the limit of its downward movement, the pawl 140 moves into the recess formed by the interruption of the teeth on the motor-winding rack 106, thereby permitting the frame to respond to the tension of the spring 138, which returns the frame and with it the arm 111 to its initial position. This upward movement causes the plate 108 to contact with the outer end of the lever 326, thus holding this lever in position to depress the plate 321 and depriving the carriage 308 of its support, permitting the locking nut 309 to fall into engagement with the rotating screw 306.

It being understood that the upward movement of the motor-winding rack 106, forming part of the coin-carrying frame, has wound the motor spring 303, which in turn, acting through the train of gears 304 and shaft 207, rotates the corn-popping drum 203, the timing mechanism now takes up further actuation of the devices, except that the arm 111 returning to its initial position, raises the arm 611 of the bell crank lever 612, closing the lower corn-controlling valve 602, and acting on the bell crank lever 609, opens the upper corn-controlling valve 601 in position to fill the corn-measuring device for the next actuation of the machine, and, at the same time, raises the lever 215 into its position, as shown in Fig. 1, to be ready to dump the refuse material from the outer drum when the machine is again actuated. The upward movement of the arm 111 acts through the reach rod 432, to rotate the rack 438 in a direction to act through the clutch 440 to move the wheel 424 over the carborundum stone 427 and ignite the wick 429. The rotation of the screw 306 carries the carriage 308 to the right, as shown in Fig. 5, until the finger 310 is stopped and engaged by the overhanging shoulder 311 of the frame A. This locks the screw 306 from rotation and stops the rotation of the popping drum. In its movement into this locked position, the carriage 308 contacts with the locking arm 323, swinging it on its pivotal point 324, thereby disengaging the finger 423 from the notch 334, permitting the long arm 422 attached to the burner-covering device to be actuated by the spring 421, to replace the cover on the burner, thereby extinguishing the flame. At the same time, the bell clapper I carried by the arm 422 sounds the bell K, to indicate to the purchaser that the popped corn is in the chute 224 ready to be removed on opening the door G. The release of the arm 422 opens the lower of the salt-controlling valves and closes the upper valve, permitting the salt contained between the valves to fall on to the popped corn in the chute 224. At the same time, the plate 441 is disengaged from its contact with the locking lever 330, permitting the return of this lever to engage the popping drum, locking the same in position against rotation, and the finger 423 disengaging the reach rod 136, permits the coin-slot-closing lever 134 to return to its normal position uncovering the coin slot, thereby placing the entire device in its initial position ready to be actuated on the insertion of another coin and the depression of the lever E.

While the device has been described with reference to its particular application as a corn-popping and vending machine, it is, of course, to be understood that the device is not limited to this specific use, and may be utilized for the vending of any similar commodity, and different parts of the device may be modified or changed within the scope of this invention, to adapt the machine to other and analogous uses, especially where fresh roasted or cooked commodities are to be vended.

Having thus described my invention, I claim as new and desire to secure by Letters Patent:

1. In a vending machine, a coin-controlled mechanism, comprising a frame having a coin chute provided with a discharge opening, a coin-carrying plate having a coin recess therein in communication with said opening in one position of the plate, a member for closing said opening and means actuated during the movement of the plate from its communicating position for locking said member in position to close said opening.

2. In a vending machine, a coin-controlled mechanism comprising a frame having a coin chute therein provided with a discharge opening, a coin-carrying plate having a coin recess therein in communication with said opening in one position of the plate, a member for closing said opening, means actuated during the movement of the plate from its communicating position for locking said member in position to close said opening, and means for unlocking said member.

3. In a vending machine, a coin-controlled mechanism comprising a frame having a coin chute therein provided with a discharge opening, a coin-carrying plate having a coin recess therein in communication with said opening in one position of the plate, a member for closing said opening, means actuated during the movement of the plate from its communicating position for locking said member in position to close said opening, means for unlocking said member, and spring controlled means acting on said member when unlocked to move the same into position uncovering said opening.

4. In a vending machine, a coin-controlled mechanism comprising a vertically movable actuating frame including two parallel members fastened together, one of said members being a coin-carrying plate having a coin recess therein and the other of said members having a rack thereon adapted to actuate a coin detector, a coin detector mounted in rear of said coin-carrying plate and adapted to rotate in said recess, and an actuating connection between said coin detector and said rack.

5. In a vending machine, a coin-controlled mechanism comprising a frame having a coin chute therein provided with a discharge opening in its lower end, a main actuating frame provided with a coin carrying plate, the said plate having a coin recess therein in communication with the said opening in one position of the plate, means for locking the coin plate in position when there is no coin in the recess, means controlled by a coin inserted in said recess for unlocking the coin plate to permit the main actuating frame to move downward, means for moving the said frame downward, a device for closing the coin discharge opening, the said device being actuated by the downward movement of the said frame to cover said coin discharge opening, a spring for normally holding said device in position to uncover said opening, means for locking said device in position to close said opening, and means for unlocking said device to permit the same to move into position to uncover said opening.

6. In a vending machine, a coin-controlled mechanism comprising a main actuating lever, an arm, a connection between said arm and lever for actuating the arm on the down stroke of the lever, a movable coin-carrying frame connected with said arm, means for locking the coin carrying frame in position to receive a coin, means controlled by a coin carried by said coin carrying frame for unlocking the coin carrying frame to permit said frame to be moved downward by said lever, and means for returning the said coin-carrying frame and arm to the initial position.

7. In a vending machine, a coin-controlled mechanism comprising a main actuating lever, an arm, actuated by the lever, a main actuating frame provided with a coin-carrying plate, the said frame being pivotally connected with one end of the said arm, the other end of said arm being pivotally connected with the frame of the machine, the said coin-carrying plate having a coin recess adapted to receive a coin, means for locking the coin carrying plate in position to receive a coin, means controlled by a coin in said recess for unlocking the coin carrying plate to permit the main actuating frame to be moved downward, and means for ejecting the coin from the recess when the coin-carrying frame is on its down stroke.

8. In a vending machine, a coin-controlled mechanism comprising a frame having a coin chute provided with a discharge opening, a main actuating lever, an arm actuated by the lever on the down stroke of the latter, a main actuating frame connected with the said arm and provided with a coin-carrying plate, the said plate having a coin recess therein in communication with said coin opening of the chute in one position of the said plate, means for locking the coin plate in position when there is no coin in the recess, means controlled by a coin in said recess for unlocking the plate to permit the said frame to move downward when the lever acts on the said arm, means for ejecting the coin from the recess when the coin-carrying frame is on its down stroke, and means for returning the said main actuating frame to its normal raised position.

9. In a vending machine, a coin controlled mechanism, comprising a main actuating lever, mechanism adapted to be actuated by said lever during the stroke of the latter in one direction, and including a frame and a coin carrying device forming part of said frame, means for locking the said frame with the coin carrying device in position to receive a coin, and means controlled by a coin carried by said coin carrying device for unlocking the said frame to permit the mechanism to be moved by the lever.

10. In a vending machine, a coin controlled mechanism comprising a main actuating lever, a main actuating arm adapted to be actuated by the lever on the down stroke of the latter, mechanism adapted to be actuated by the said arm and including a frame, a coin carrying plate forming part of said frame, means for locking the said frame in the initial position, and means controlled by a coin inserted in the coin carrying plate for unlocking the said frame to permit the said mechanism to be actuated by the arm on the downward movement of the lever.

11. In a vending machine, a coin controlled mechanism, comprising a main actuating lever, a main actuating arm adapted to be actuated by the lever on the down stroke of the latter, mechanism adapted to be actuated by the said arm on the introduction of a coin, and including a frame connected with the said arm and a coin carrying device forming part of said frame, and means for returning the said mechanism and the main actuating arm to initial position.

12. In a vending machine, a coin controlled mechanism, comprising a vertically movable actuating frame, a coin carrying plate forming part of said frame, a main actuating lever, a main actuating arm pivoted at one end to the frame of the machine, a link connecting the other end of said arm with the actuating frame, the said arm being adapted to be actuated by the said lever on the down stroke of the latter, means for locking the main actuating frame with the coin carrying plate in position to receive a coin, and means controlled by an inserted coin for unlocking the said main actuating frame to permit the latter to move downward when the lever acts on the said arm.

13. In a vending machine, a coin controlled mechanism, comprising a main actuating frame, a coin carrying plate forming part of said frame, means for locking the said main actuating frame with the coin carrying plate in position to receive a coin, means controlled by a coin carried by said coin carrying plate for unlocking the said main actuating frame, actuating means for moving said frame in one direction when the said frame is unlocked, and means for returning the said main actuating frame to initial position.

14. In a vending machine, a coin controlled mechanism, comprising a vertically movable main actuating frame, a coin-carrying plate forming part of said frame, a main actuating lever, a pivoted main actuating arm connected with the said main actuating frame, and adapted to be actuated by the said lever on the down stroke of the latter, means for locking the main actuating frame in the raised or normal position with the coin carrying plate in position to receive a coin, means controlled by an inserted coin for unlocking the said main actuating frame, to permit the latter to move downward when the lever acts on the said arm, means for ejecting the coin from the coin carrying plate when the frame is on its down stroke, and springs for returning the said main actuating frame and main actuating arm to the initial position.

In testimony whereof I have signed my name to this specification in the presence of two subscribing witnesses.

GUSS A. LIGHTNER.

Witnesses:
J. W. MORTON,
E. D. MATHEWSON.